United States Patent
Muth et al.

(10) Patent No.: US 10,110,321 B2
(45) Date of Patent: Oct. 23, 2018

(54) TECHNIQUES FOR PROVIDING ADAPTIVE POWER DISTRIBUTION USING A MULTI-NODE NETWORK OF POWER FEED BRANCHING UNITS (PFBUS) AND AN UNDERSEA OPTICAL COMMUNICATION SYSTEM USING SAME

(71) Applicant: TYCO ELECTRONICS SUBSEA COMMUNICATIONS LLC, Eatontown, NJ (US)

(72) Inventors: Edwin Muth, Aberdeen, NJ (US); Stanley Wisniewski, II, Cream Ridge, NJ (US); Leonard J. Taylor, South Orange, NJ (US); Arthur A. Baumgarten, Basking Ridge, NJ (US)

(73) Assignee: TYCO ELECTRONICS SUBSEA COMMUNICATIONS LLC, Eatontown, NJ (US)

( * ) Notice: Subject to any disclaimer, the term of this patent is extended or adjusted under 35 U.S.C. 154(b) by 0 days.

(21) Appl. No.: 15/461,448

(22) Filed: Mar. 16, 2017

(65) Prior Publication Data
US 2018/0269990 A1   Sep. 20, 2018

(51) Int. Cl.
*H04B 10/00* (2013.01)
*H04B 10/80* (2013.01)
(Continued)

(52) U.S. Cl.
CPC ......... *H04B 10/807* (2013.01); *H04B 10/524* (2013.01); *H04J 14/0202* (2013.01)

(58) Field of Classification Search
CPC .. H04B 10/807; H04B 10/808; H04B 10/524; H04B 13/02; H04B 3/44; H04B 10/29;
(Continued)

(56) References Cited

U.S. PATENT DOCUMENTS

| 4,798,969 A | 1/1989 | Inoue et al. |
| 5,196,984 A | 3/1993 | Webb |

(Continued)

FOREIGN PATENT DOCUMENTS

WO   2016/092806 A1   6/2016

OTHER PUBLICATIONS

International Search Report, Application No. PCT/IB2018/051029, International Filing Date, Feb. 20, 2018.

*Primary Examiner* — Hibret Woldekidan

(57) ABSTRACT

In general, a branching configuration used in a wavelength division multiplexed (WDM) optical communication system, consistent with the present disclosure, includes a power feed branching unit (PFBU) having a multi-port DC/DC converter (DDCM) arrangement capable of a plurality of operating modes to distribute power in a bi-directional manner. The DDCM arrangement may include a plurality of ports for electrically coupling to one or more trunk path cable segments and for electrically coupling to a branch cable segment. A plurality of PFBUs may be disposed along a trunk path, with each PFBU powering an associated branch path, without each branch path necessarily having local power feed equipment (PFE). In instances where a branch path includes a local PFE, an associated PFBU may draw power from the branch path in order to make power available to the trunk path as needed.

20 Claims, 6 Drawing Sheets

(51) Int. Cl.
*H04J 14/02* (2006.01)
*H04B 10/524* (2013.01)

(58) Field of Classification Search
CPC ..... H04B 3/36; H04B 10/806; H04J 14/0202; H04J 14/0201; H04J 14/021; H04J 14/0221
USPC .................. 398/83, 104, 105, 175, 94, 173
See application file for complete search history.

(56) References Cited

U.S. PATENT DOCUMENTS

| | | | |
|---|---|---|---|
| 5,790,358 A * | 8/1998 | Kojima | H04B 3/44 307/127 |
| 6,157,098 A * | 12/2000 | Kojima | H04B 10/808 307/113 |
| 6,496,626 B2 * | 12/2002 | Spagnoletti | H02G 15/14 307/112 |
| 7,085,456 B1 * | 8/2006 | Nagel | G02B 6/4441 385/100 |
| 7,102,257 B2 | 9/2006 | Muramatsu et al. | |
| 7,233,744 B1 | 6/2007 | Trischitta | |
| 7,276,811 B2 * | 10/2007 | Muramatsu | B60L 11/1811 307/19 |
| 8,750,707 B2 * | 6/2014 | Sabet | H04B 10/0705 380/263 |
| 9,559,776 B2 * | 1/2017 | Kamalov | H04B 10/2575 |
| 9,712,274 B2 * | 7/2017 | Thoguluva | H04J 14/0282 |
| 9,749,082 B2 * | 8/2017 | Muth | H04J 14/0204 |
| 2003/0230936 A1 * | 12/2003 | Muramatsu | H04B 3/44 307/69 |
| 2004/0130215 A1 * | 7/2004 | Muramatsu | B60L 11/1811 307/69 |
| 2013/0202285 A1 | 8/2013 | Lecroart et al. | |
| 2014/0117775 A1 * | 5/2014 | Agata | H01H 9/00 307/113 |
| 2016/0049788 A1 * | 2/2016 | Linkhart | H02J 3/006 307/115 |

* cited by examiner

TECHNIQUES FOR PROVIDING ADAPTIVE POWER DISTRIBUTION USING A MULTI-NODE NETWORK OF POWER FEED BRANCHING UNITS (PFBUS) AND AN UNDERSEA OPTICAL COMMUNICATION SYSTEM USING SAME

TECHNICAL FIELD

The present disclosure relates to optical communication systems, and in particular, to distributing power in an optical communication system using a multi-node network to accommodate for fault conditions and/or changes in load.

BACKGROUND

To maximize the transmission capacity of an optical communication system, a single optical fiber may be used to carry multiple optical signals in what is called a wavelength division multiplexed system (hereinafter a WDM system). The multiple optical signals may be multiplexed to form an aggregate multiplexed signal or WDM signal with each of the multiple signals being modulated on separate wavelengths referred to as channels. Modern WDM systems have a high traffic capacity, for example, a capacity to carry 100 or more channels at 100 gigabits per second (hereinafter Gb/s) per channel, or more.

A WDM optical transmission system may include a relatively long trunk path (e.g., optical fiber) that may be terminated at a transmitting and/or receiving trunk terminal. Some systems, such as long haul-systems, may have a length between terminals of about 6,000 kilometers, or more, to span large bodies of water (e.g. oceans). Cables providing a trunk path may include one or more electrical conductors for delivering power to subsea components such as repeaters, amplifiers, and branching units, in order to maintain nominal signal power over relatively long distances.

Increasingly subsea optical communication systems are limited by the ability to deliver power to components via a trunk cable. Distances of 10,000 to 12,000 km, for example can be reached by some approaches to power distribution, but the transmission capacity is limited by the voltage and current that can be delivered to the subsea elements by the trunk cable. Options to increase optical bandwidth such as Raman amplification, increasing optical pump power, expanding beyond the "C" band and increasing the number of amplified fibers unfortunately require power in excess of present system capabilities. Cable resistance reduction based on increasing the quantity of high conductivity materials introduces a significant increase to the cable cost. System voltage increases also typically increases cost, and are often constrained by production technology and materials. Some gains can be made through careful design and engineering, but constraints remain and the cost of re-architecting an existing undersea optical communication system, e.g., modifying a trunk cable, and its associated functional elements (e.g., branching units, amplifiers, and so on), raise numerous non-trivial challenges.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
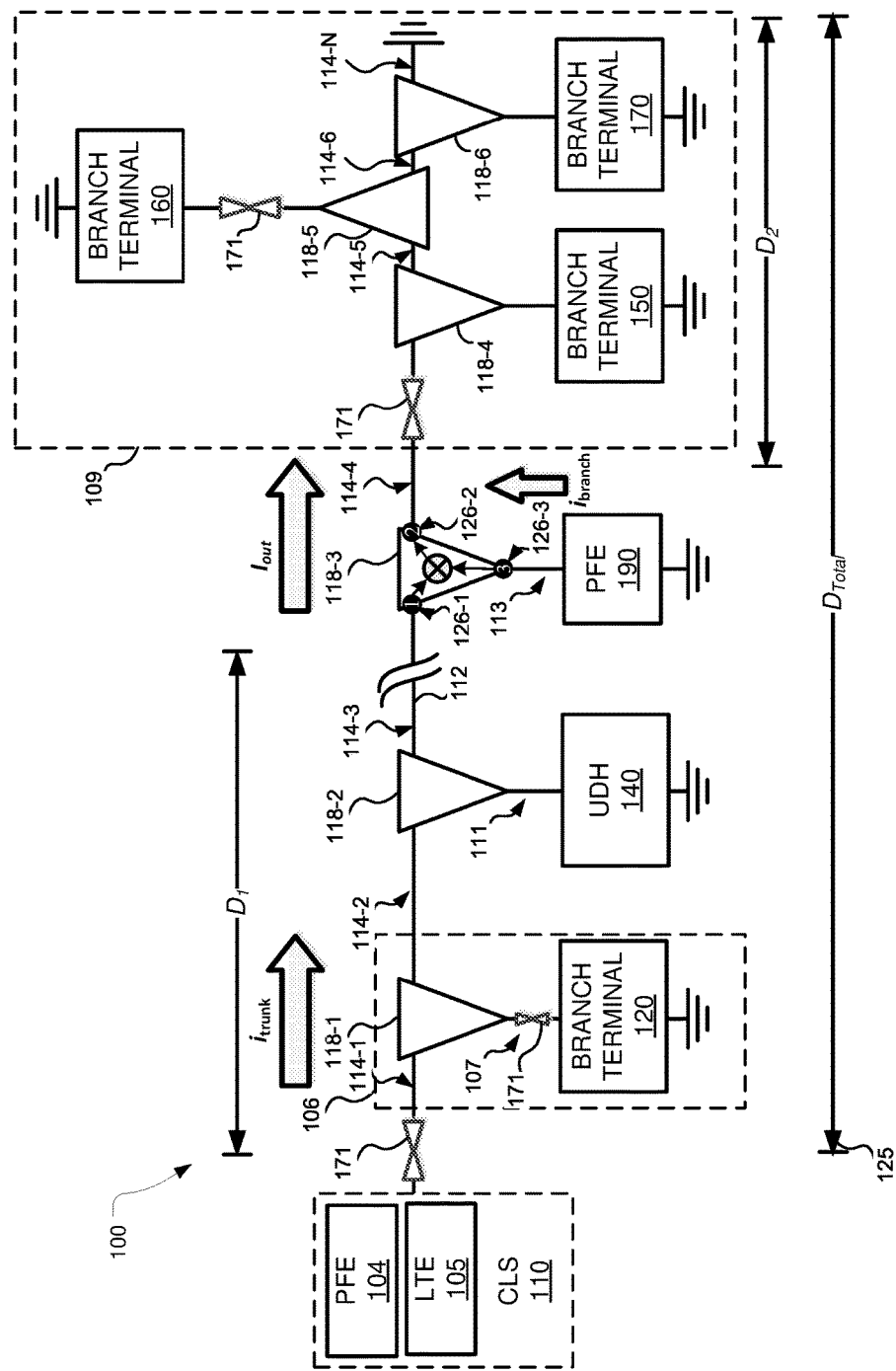
FIG. 1 is a schematic illustration of an optical communication system consistent with an embodiment of the present disclosure.

In general, a branching configuration used in an optical communication system consistent with the present disclosure, includes one or more power feed branching unit (PFBU) having a multi-port DC/DC converter module (DDCM) arrangement capable of a plurality of operating modes to distribute power in a bi-directional manner. The branching configuration may be particularly well suited for wavelength division multiplexed (WDM) systems, but this disclosure is not intended to be limited in this regard. The DDCM arrangement may include a plurality of ports for electrically coupling to one or more trunk path cable segments, e.g., via electrical conductors within cable segments, and for electrically coupling to a branch cable segment. The ports coupled to the trunk cable segments may be electrically isolated from the port coupled to the branch cable segment. In an embodiment, a plurality of PFBUs may be disposed along a trunk path, with each PFBU powering an associated branch path via power feed equipment coupled to the trunk path, thereby allowing branch paths to be unpowered, e.g., without a local Power Feed Equipment (PFE). In instances where a branch path includes a local PFE, an associated PFBU may draw power from the branch path in order to make power available to the trunk path as needed. Likewise, a first trunk path may be coupled to a second trunk path via a so-called "bridging" branch path whereby a first PFBU is coupled to the first trunk path at one end of the bridging branch path, and a second PFBU is coupled to the second trunk path at the other end of the bridging branch path. In this embodiment, the PFBUs at either end of the bridging branch path may operate in concert to draw power from the first trunk path for use by the second trunk path, and vice-versa.

In any event, a plurality of PFBUs along a trunk path may collectively form a DC grid and may regulate/balance overall power based on predetermined set points that seek to maintain constant current or voltage and cable resistance within desired limits. As each PFBU may source/sink current as needed from an associated branch path or bridging branch path, the PFBUs may therefore provide a "shared" powering scheme, which may also be referred to as a crowd powering scheme. In a shared power scheme, the trunk path may therefore be powered via multiple PFBUs with redundancies/overlap built in that ensures nominal power even in the event one or more supplies fail or become disconnected, e.g., due to a fault condition such as cable cut or component failure. The shared power scheme may allow an optical communication system to have a trunk path that spans a distance that far exceeds present limitations, e.g., up to 10,000 km or more depending on a desired configuration. In addition, the DC grid formed by the PFBUs allows total available power for optical amplification (and other subsea applications) to exceed the maximum power available in other approaches to undersea optical communication systems without necessarily losing redundancy in the event of cable faults and/or component failure. The PFBUs of the present disclosure also allow an optical communication system to have a relatively low system voltage and current limit which may advantageously reduce system costs, component lifespans, and complexity.

Turning to the figures, FIG. 1 illustrates one example WDM optical communication system (or optical system) 100 in accordance with an embodiment of the present disclosure. The optical communication system 100 is shown in a highly simplified form and other embodiments are within the scope of this disclosure. The optical communication system 100 includes one or more trunk terminals, e.g., at cable landing station (CLS) 110, coupled to a trunk path, e.g., trunk path 112, to transfer optical signals and power to nodes coupled along the trunk path 112. The trunk path 112 may include a plurality of undersea optical cable segments, e.g., undersea cable segments 114-1 . . . 114-N, that include one or more fiber and electrical conductors. The term "coupled" as used herein refers to any connection, coupling, link or the like by which signals carried by one system element are imparted to the "coupled" element. The term "signal" is not necessarily limited to optical signals and also encompasses power that may be delivered via cables of the optical communication system 100. Such "coupled" devices are not necessarily directly connected to one another and may be separated by intermediate components or devices that may manipulate or modify such signals.

The optical communication system 100 can include a single-ended configuration, such as shown in FIG. 1, wherein the trunk path 112 includes a single CLS 110 and PFE 104, which are located at an end of the optical communication system 100. The optical communication system 100 may use the principle of, for instance, sea water/earth ground return. In this embodiment, the optical communication system 100 of FIG. 1 may include current flowing through a single conductor within transmission cables and a return path via the sea water/ground operating as a return conductor, e.g., an electrode (not shown) may be in contact with the sea water or earth ground at each subsea node. This single-ended configuration may be particularly advantageous compared to the other AC power distribution approaches which require at least two (2) conductors in single phase systems, or three (3) conductors in three-phase systems.

Figure 4:
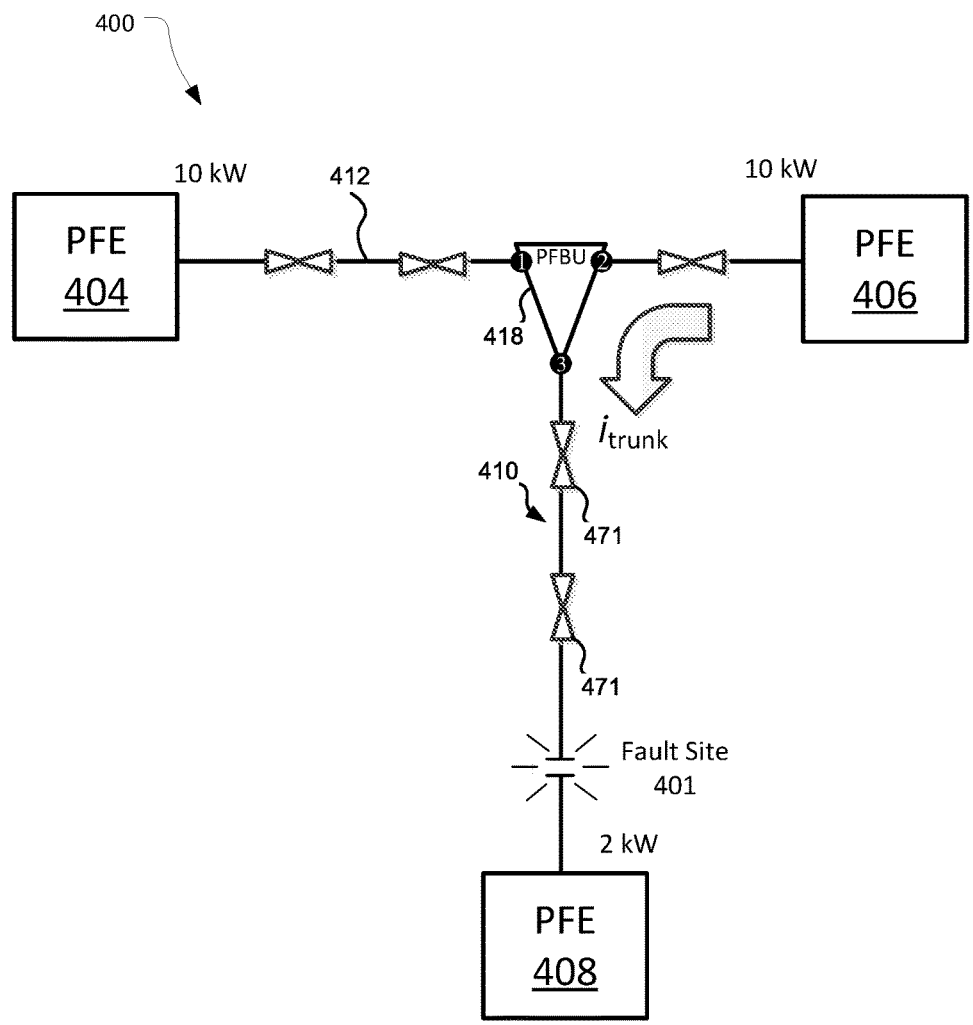
FIG. 4 is another schematic illustration of an optical communication system consistent with an embodiment of the present disclosure.

The trunk path 112 may include a plurality of branching units (BUs), e.g., BUs 118-1 . . . 118-6, disposed along the trunk path 112. The CLS 110 may provide both power feed equipment (PFE) 104 for electrical power distribution and line terminating equipment (LTE) 105 to send and receive optical signals. Note the PFE 104 may not necessarily generate power locally at the CLS 110 and may source at least a portion of the power introduced into cables of the optical communication system 100 from a terrestrial power grid or other suitable power source. Note that the optical communication system 100 may include other power distribution configurations such as double-ended configurations wherein the trunk path 112 may extend between two or more CLSs each having PFEs, e.g., as shown in FIG. 4.

The PFE 104 may electrically couple to the trunk path 112, and more particularly, to one or more electrical conductors in each of the cable segments 114-1 . . . 114-N. Each of the BUs 118-1 . . . 118-6 may electrically couple each cable segment to an adjacent cable segment. Each of the BUs 118-1 . . . 118-6 may also optically couple adjacent cable segments and an associated branch path cable segment, e.g., via optical fiber. For example, each of the BUs 118-1 . . . 118-6 may include, for example, express channel pass-through configurations, filter arrangements such as optical add/drop multiplexers (OADMs), optical couplers, or any combination thereof. Therefore, cable segment 114-1 may be coupled both electrically and optically to the cable segment 114-2 via BU 118-1; cable segment 114-3 may be coupled both electrically and optically to the cable segment 114-4 via BU 118-2, and so on. Each of the BUs 118-1 . . . 118-6 may include a plurality of ports, e.g., at least a first and second port for coupling to respective cable segments of the trunk path 112, and a third port for coupling to a branch path cable segment. The first and second ports coupled to respective cable segments of the trunk path 112 may be electrically isolated from the third port coupled to the branch path cable segment to prevent damage in the event of fault conditions (e.g., a cable cut, component failure, and so on) and for safety during maintenance and replacement, and each of the ports may be configured to support bi-directional flow of power as will be discussed in greater detail below.

Each of the BUs 118-1 . . . 118-6 may support both branch path communication, e.g., sending/receiving of channel wavelengths, and also distribution of power to components coupled along a given branch path depending on a desired configuration. For example, each of the BUs 118-1 . . . 118-6 may optically couple channel wavelengths to/from an associated branch path, e.g., branch paths 107, 111, using filtering arrangements such as a fixed or reconfigurable OADM arrangement or other suitable filter/coupling device (e.g., band-pass filters, block filters, optical couplers, and so on). Note that in some instances it may be desirable to provide all channel wavelengths from the trunk path 112 to a given branch path. Accordingly, each BU (or PFBU) may not necessarily include filtering devices nor be configured identical to other BUs within the optical communication system 100. Each BU can also contain fiber optic switches to reconfigure the fiber paths.

The branch paths, e.g., branch paths 107 and 111, may also include optical fiber in optical cable segments to provide a transmission path for bi-directional communication of optical signals. The optical communication system 100 may therefore be configured to provide bi-directional communication of optical signals between nodes, e.g., the CLS 110 and branch terminals, BUs, and so on. For ease of explanation, the description herein may refer to transmission from one terminal to another. It is to be understood, however, that the system 100 may be configured for bi-directional or uni-directional communication between nodes.

The components in the trunk and branch paths may include various configurations for achieving their intended functionality. The repeaters 171, for example, may include any optical amplifier/repeater configuration that compensates for signal attenuation on the transmission path. For example, one or more of the repeaters may be configured as an optical amplifier, such as an erbium doped fiber amplifier (EDFA), a Raman amplifier, or a hybrid Raman/EDFA amplifier. Also, one or more of the repeaters may be provided in an optical-electrical-optical configuration that regenerates an optical signal by converting it to an electrical signal, processing the electrical signal and then retransmitting the optical signal.

The optical communication system 100 may be configured as a long-haul system, e.g. having a total distance ($D_{Total}$) 125 of more than about 1000 km, which spans a body of water, e.g. an ocean. For example, long-haul systems may include distances of about 6000-20,000 km, or more. The branching units, e.g., BUs 118-1 ... 118-6, may be seated on the ocean floor in an undersea environment.

Each of the BUs 118-1 ... 118-6 may also be configured to electrically couple an associated branch path to the trunk path 112 to provide power for consumption by components coupled thereto. For example, and as shown, the branch path 107 includes a repeater/optical amplifier 171 and branch terminal equipment 120. Thus, equipment coupled along the branch path 107 may be configured to operate exclusively, or at least in part, from power distributed via the trunk path 112. The branch configuration 106 may be accurately referred to as an unpowered or semi-powered branch when configured to operate at least in part on power distributed via the trunk path 112. Branch configurations may also be at least partially self-powered, e.g., include a local PFE, depending on a desired configuration. Each branch path, e.g., branch path 107, 111, may vary in length, e.g., from hundreds of kilometers to thousands of kilometers depending on a desired configuration, and may include an optical amplifier, e.g., optical amplifier 171, to ensure nominal optical performance along the entire length.

Various power schemes may be implemented by the optical communication system 100 including, for example, constant current or constant voltage distribution schemes. However, various characteristics of the optical communication system 100, such as the number of components drawing power from the trunk path 112, the extent of that power consumption, and overall length of the trunk 112, may significantly limit the availability of power along the trunk 112. For instance, the one or more undersea cables, e.g., cable segments 114-1 ... 114-N, forming the trunk path 112 may introduce about a 1 ohm per kilometer (km) increase in resistance (depending on optical fiber cable characteristics), which can significantly reduce power in long-haul systems that extend tens of thousands of kilometers, for example.

Accordingly, the optical communication system 100 may have a limited capacity based on the power requirements along the trunk 112 and the overall length of the optical communication system, e.g., based in part on resistive losses. For example, the PFE 104 may be configured to provide a sufficient amount of power along cable segments 114-1 and 114-3 up to distance $D_1$ to support operation of the optical amplifier 171, BUs 118-1, 118-2, branch paths 107, 111 and components coupled thereto, e.g., branch terminal equipment 120 and underwater distribution hub (UDH) 140. However, extending the trunk path 112 by distance $D_2$ to accommodate a trunk path region 109 may be prevented based on the aforementioned power distribution limitations of the optical communication system 100.

Thus, and in accordance with an embodiment of the present disclosure, the trunk path 112 may include at least one BU configured as a power feed branching unit (PFBU). For example, the BU 118-3 may be implemented as a PFBU consistent with the present disclosure, and may be also be referred to as PFBU 118-3. Other BUs may be configured as power switching branch units (PSBUs), which may include electrical circuitry that simply electrically couples an associated branch path to the trunk path 112 and isolation capabilities in the event of fault (e.g., a clamp to sea ground), but PSBUs do not include bi-directional power distribution capabilities, power conditioning, and other power regulation aspects the PFBUs as variously disclosed herein.

The PFBU 118-3 may be configured substantially similar to a BU as discussed above, e.g., include OADM functionality, filters, express channel capability, and so on, but with additional circuitry configured to allow two or more ports to source power for distribution via a third port. Stated differently, the PFBU 118-3 may include circuitry configured to source power via a first port 126-1 coupled to trunk segment 114-3 and/or a third port 126-3 coupled to branch path 113 to provide output power via a second port 126-2 for components coupled along trunk path region 109, and more particularly for consumption by optical components along cable segments 114-5 ... 114-N, for example. The circuitry of the PFBU 118-3 may include a DC-DC converter module (DDCM) arrangement that allows current to be sourced via the first port 126-1, e.g., $i_{trunk}$, the third port 126-3, e.g., $i_{branch}$, or a combination of the first and third port, e.g., $i_{trunk}+i_{branch}$. This DDCM arrangement may be accurately described as a multi-input, single-output converter. Table 1 summarizes the various example DDCM converter modes of the PFBU 118-3 in this embodiment:

TABLE 1

| Mode | Input Port(s) | Output port(s) |
| --- | --- | --- |
| Trunk Source | 1 | 2 |
| Branch Source | 3 | 2 or 1 |
| Multi/Dual Source | 1 & 3 | 2 |
| Branch Feed | 1 | 3 |

The PFBU 118-3 may operate in a trunk source mode whereby output current ($I_{out}$) is provided via the second port 126-2 and is exclusively sourced from the trunk current ($i_{trunk}$) fed by the cable segment 114-3 into the first port 126-1 of the PFBU 118-3. In the branch source mode, the PFBU 118-3 provides output current ($I_{out}$) via the second port 126-2, with output current ($I_{out}$) being exclusively sourced from the branch current ($i_{branch}$) via the third port 126-3. In some cases, the output current $I_{out}$ may be supplied via the first port 126-1 in the event PFE 104 fails, for example.

In the dual source mode, which may also be referred to as a multi-source mode, the PFBU 118-3 provides output current ($I_{out}$) via the second port 126-2 based on combination of current drawn from the first and third ports 126-1, 126-3, e.g., trunk current ($i_{trunk}$) and branch current ($i_{branch}$), respectively. In particular, depending on the load of the components in the trunk path region 109, a constant current set point (e.g., 1 amp) may be maintained via a voltage boost if a constant current mode is desired. For instance, in the event that load exceeds available power by 2 kW, voltage may be increased via the second port 126-2 by keeping the same at a higher voltage than the first port 126-1 relative to ground. Accordingly, as power P is equal to I*V (P=I*V), voltage may be increased to provide sufficient power.

The current via the second port 126-2 may therefore be kept constant even when additional power is needed to service components of trunk region 109. As will be discussed further below, the particular amount of current drawn from the first and third ports 126-1, 126-3 in the multi-source mode may be prioritized to favor one port over the other, which is to say asymmetrically draw a larger ratio of current from one port versus the other. In some cases, an equal amount of current is drawn from each port (e.g., a 1:1 ratio). In the branch feed mode, power may be sourced via the first port 126-1 and provided exclusively to a branch path via the second port 126-2.

Figure 5:
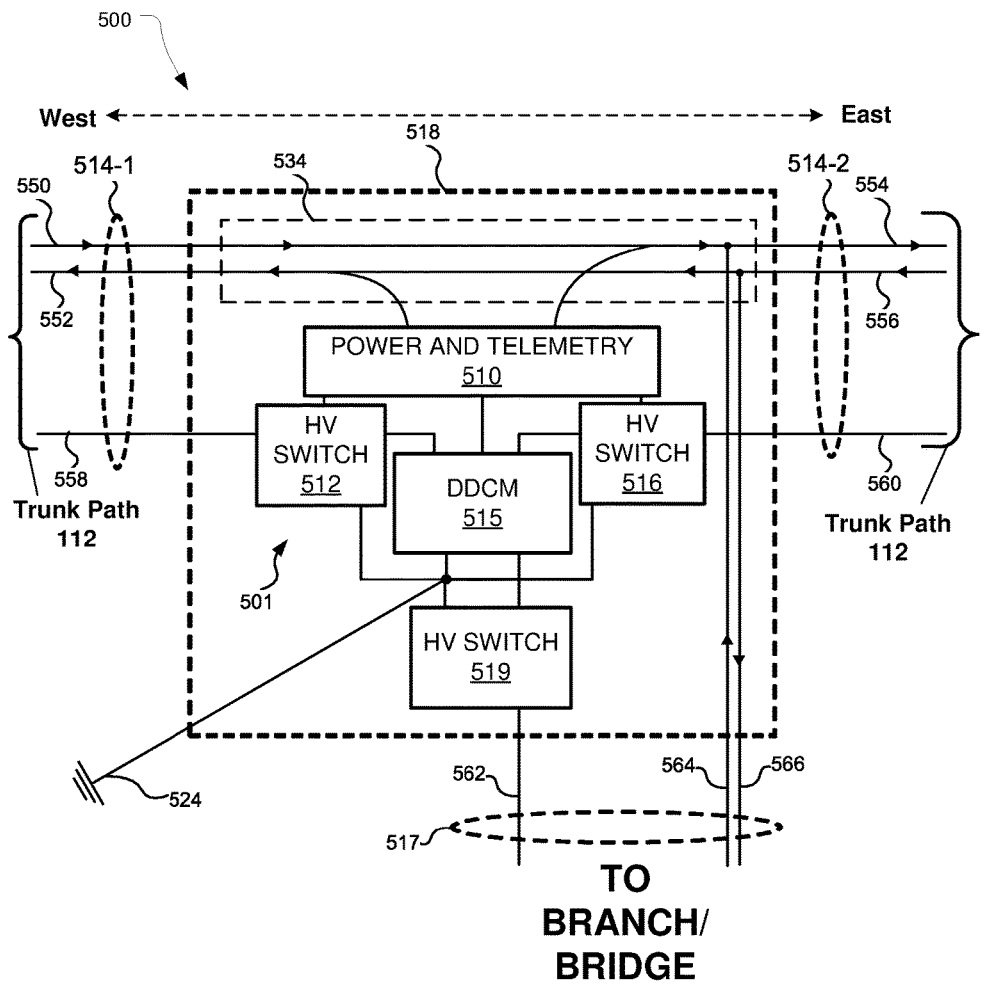
FIG. 5 is a schematic illustration of an embodiment of a power feed branching unit (PFBU) consistent with an embodiment of the present disclosure.
Figure 6:
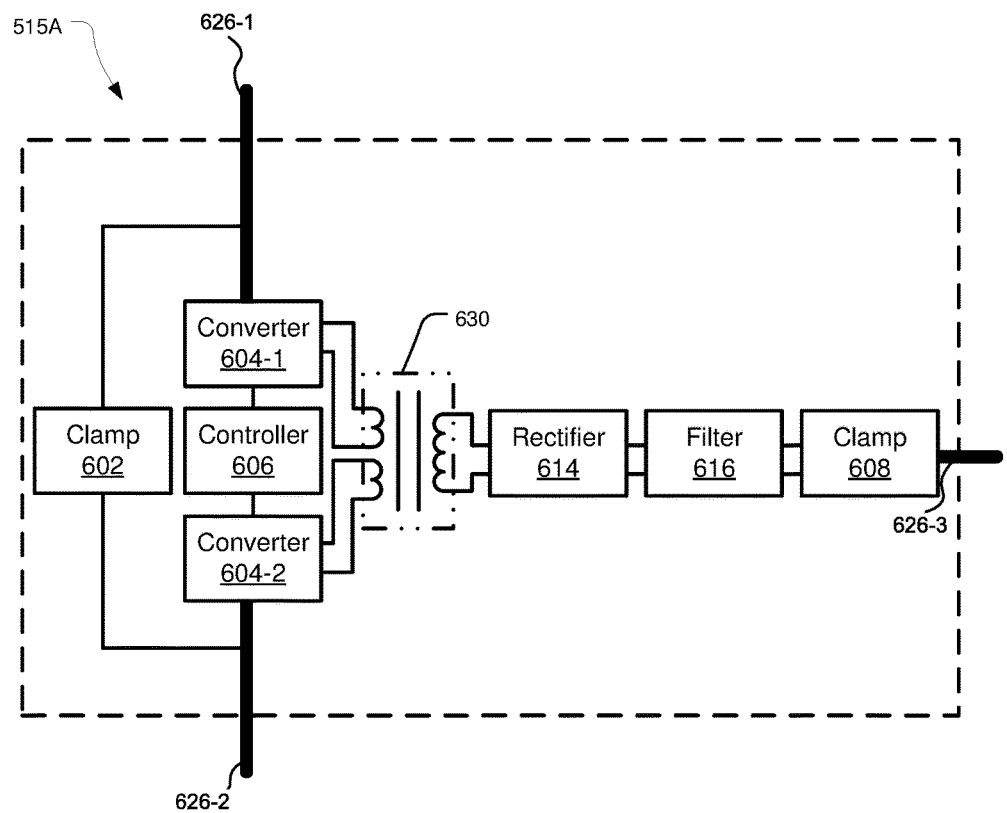
FIG. 6 is a schematic illustration of an example converter arrangement suitable for use in the PFBU of FIG. 5.

In any event, the amount of current drawn from one or both of the first and third ports 126-1, 126-3 may be based on a control/regulation scheme implemented by a controller of a PFBU, e.g., the controller 606 of FIG. 6, to provide efficient regulation to maintain a predetermined set point, which is discussed in greater detail with regard to FIGS. 5 and 6.

The PFBU 118-3 may operate in one of a plurality of operational modes including an initialization mode, a constant current mode, a safety mode (e.g., to allow for repairs and maintenance), and a constant voltage mode. During the initialization mode, the PFBU 118-3 may essentially 'boot up' by drawing a relatively small amount of power from the first or third port 126-1, 126-3 to energize at least a portion of the associated DDCM arrangement as power becomes available. Therefore, the PFBU 118-3 may be configured to automatically initialize once a sufficient amount of power is available via the trunk path 112 or an associated branch path. While the following description refers to the first and third ports 126-1, 126-3 respectively as being "input" ports that may be used alone or in combination for extracting current, this disclosure is not necessarily limited in this regard. For example, any one of the first, second and third ports 126-1, 126-2, 126-3 respectively may be used as an input power to at least partially power internal loads of the PFBU 118-3 to begin initialization.

The PFBU 118-3 may then transition into the initialization mode to receive, e.g., via optical signaling provided by optical cables of the optical communication system 100 and/or values stored in a memory, various operating parameters when at least partially powered. The operating parameters may include a value that represents a particular operational mode, e.g., a constant current source mode or a constant voltage source mode, for the DDCM arrangement of the PFBU 118-3. In addition, the operating parameters may include a predetermined set point for the identified operational mode, such as a constant voltage target value or a constant current target value, as the case may be. The PFBU 118-3 may also receive other operating parameters that define a prioritization scheme to draw/extract power from, for example, the first port 126-1 versus the third port 126-3 based on a predetermined ratio or other threshold value. For example, the prioritization scheme may define a maximum current value for a given port to limit the total current extracted from the same. In other cases, the prioritization scheme may enforce a constant ratio of power drawn from the first port 126-1 relative to the third port 126-3, such as 1:1: (50/50), 2:1, 3:1, 4:1, and so on. Therefore, the prioritization scheme implemented via a control loop may dynamically draw power asymmetrically or symmetrically from each input port depending on a desired configuration.

The PFBU 118-3 may then use the operating parameters to select an operational mode for the DDCM arrangement, a prioritization scheme, and set point associated with the operational mode. After initialization, the PFBU 118-3 may transition into a selected operational mode (e.g., constant current or constant voltage) once a measured current/voltage level of the first port 126-1 and/or third port 126-3 exceeds a threshold value (e.g., 1 amp). For example, if power was recently restored between the PFE 104 and the trunk path 112, and more particularly, the cable segments 114-1 . . . 114-3, power may ramp up over a period of time in a controlled fashion as each of the BUs 118-1 . . . 118-2 come online and begin outputting power one after another in series. Thus, the PFBU 118-3 may operate the associated DDCM arrangement in the selected operational mode in response to measuring a sufficient amount of power available via the first port 126-1 and/or the third port 126-3, to operate the DDCM arrangement and regulate power output in accordance with the identified operational mode, source priority scheme, and associated set point.

In the constant current mode, the PFBU 118-3 seeks to output a relatively constant current level via the second port 126-2. In the constant voltage mode, the PFBU seeks to output a relatively constant voltage level via the second port 126-2. Each of these modes as implemented by the DC-DC converter arrangement is discussed in greater detail further below with regard to FIGS. 5 and 6.

In some cases, a plurality of BUs, e.g., BU 118-1 . . . 118-6, of the optical communication system 100 may each be implemented as a PFBU consistent with the present disclosure. The trunk path 112 may thus provide a plurality of PFBUs in series in order to distribute power in an efficient, fault-tolerant manner. For instance, the plurality of PFBUs 118-1 . . . 118-6 may be configured in a constant current mode to allow for a relatively constant current to be available along each of the cable segments 114-1 . . . 114-N. In addition, the plurality of PFBUs 118-1 . . . 118-6 allow for fault conditions to occur along the trunk path 112, e.g., based on a component failure and/or cable cut, and automatically isolate an affected portion of the trunk path 112 while allowing other unaffected portions to remain powered. For instance, the PFBU 118-3 may automatically switch to the aforementioned branch source mode in the event of a fault condition occurring along the cable segment 114-3. In this instance, the PFBU 118-3 may switch the first port 126-1 to sea ground, for example, to isolate the faulted cable segment 114-3. Power may thus be drawn from the branch path 113 (which may be referred to as branch path cable segment 113), and more particularly the PFE 190, in order to supply power along the cable segments 114-4, 114-6, 114-N. Components coupled to the cable segments 114-4, 114-6, 114-N such as the BUs 118-4, 118-5, 118-6 allow for the branch terminals 150, 160, 170 to continue to communicate an in intra-node fashion.

Therefore, a PFBU may automatically switch between trunk source mode, branch source mode, and multi-port source mode in response to a fault condition that prevents or otherwise degrades power delivered to the first and third ports 126-1, 126-3, respectively, of the PFBU 118-3. Alternatively, or in addition to automatically switching between the aforementioned source modes, a PFBU may switch between source modes based on an optical signal received via transmission cables of the optical communication system 100, e.g., from a network operations center (NOC), of the optical communication system 100.

One or more of the BUs 118-1 . . . 118-6 may be configured with converter arrangements, such as a DDCM arrangement, that down-steps/down-converters power fed to an associated branch path. For example, BU 118-2 may be configured to step-down a high voltage signal, e.g., 10 kilovolt (kV), to a medium voltage, e.g., 400v, for consumption by components coupled to the branch path 111. The underwater distribution hub (UDH) 140 may receive the medium voltage and convert the same to a low voltage, e.g., 12v, for consumption by scientific sensors, underwater autonomous vehicles (UAVs), and so on. In other cases, each of the BUs 118-1 . . . 118-6 may simply electrically couple an associated branch path to the trunk path 112 without conditioning/converting power.

One or more of the BUs 118-1 . . . 118-6 may be configured as a stubbed PFBUs. The stubbed PFBUs may be initially deployed without an associated branch path or bridge path cable segment. In this instance, a stubbed PFBU may later be retrieved, e.g., brought top-side by a ship, and coupled to an associated branch path or bridge path cable segment, and more particularly coupled to a third port of a stubbed PFBU, to expand the optical communication system 100. This allows a stubbed PFBU to be, in a general sense, a place holder for future expansion of the optical communication system 100 while still allowing the PFBU to advantageously provide a constant current (or constant voltage) to an associated trunk path cable segment without necessarily being coupled to an associated branch path when first deployed. Future upgrades may then be performed without necessarily interrupting trunk traffic during the upgrade.

Figure 2:
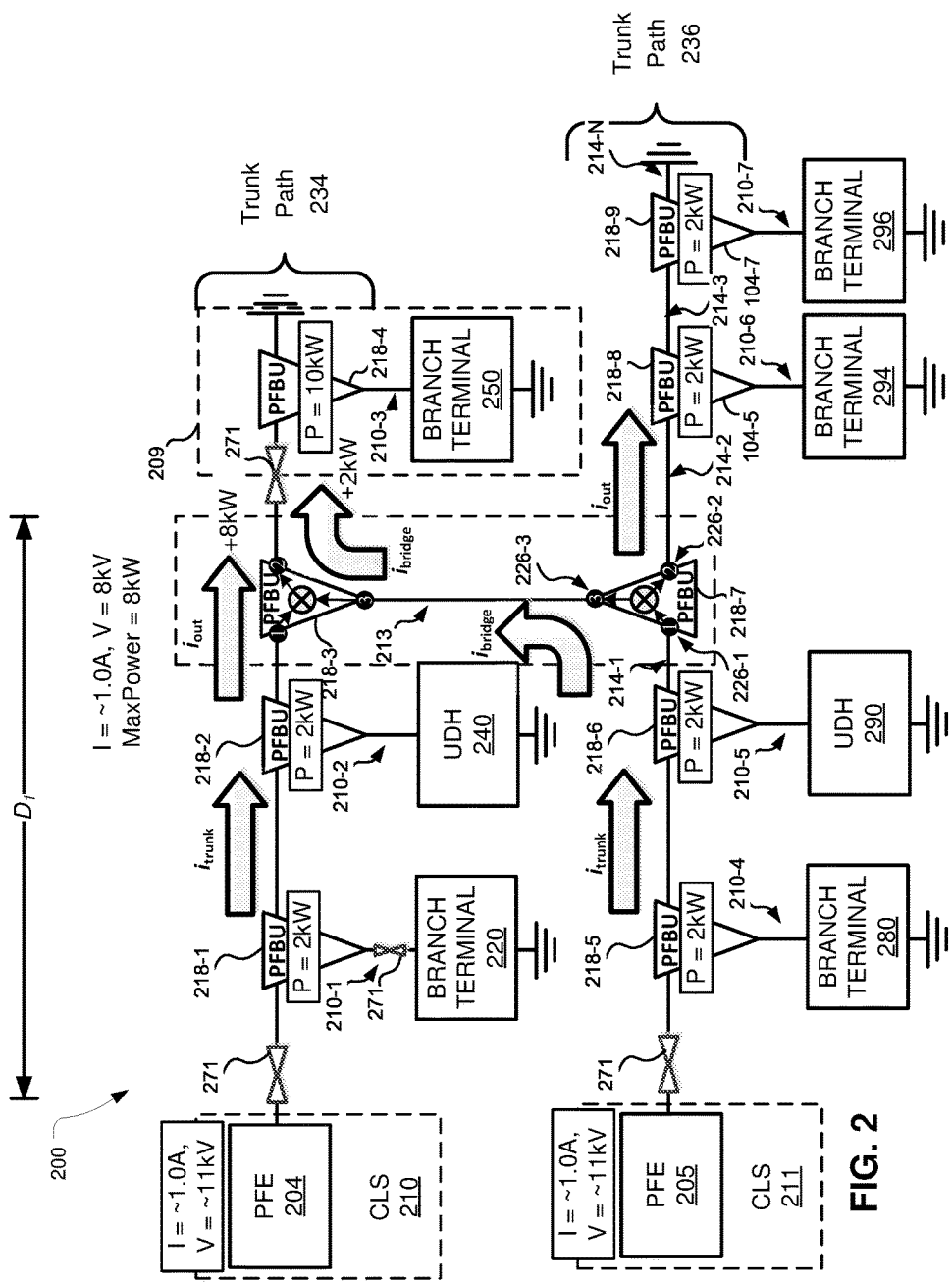
FIG. 2 is another schematic illustration of an optical communication system consistent with an embodiment of the present disclosure.

Turning to FIG. 2, an example optical communication system 200 is shown in accordance with an embodiment of the present disclosure. The optical communication system 200 is shown in a highly simplified form and other embodiments are within the scope of this disclosure. As shown, the optical communication system includes two trunk paths, namely a first trunk path 234 and a second trunk path 236. Each of the first and second trunk paths 234, 236 may be configured as long-haul systems capable of extending hundreds to tens of thousands of kilometers.

Each of the first and second trunk paths 234, 236 are coupled to CLS 210, 211 respectively. Each of CLS 210, 211 include a PFE 204, 205 respectively that may be configured to provide, for example, 11 kV at a constant amperage of about 1.0 A. CLS 210, 211 may further include LTE devices coupled to each respective trunk path, such as LTE 105, but have been illustrated in a simplified form merely for clarity. Each of the PFEs 204, 205 may be configured to output a wide range of current levels, e.g., 0.5 A to 1.5 A or more, as well as a wide range of voltage levels, e.g., 1 kV to 15 kV or more, depending on a desired configuration. Note while the foregoing description specifically discusses the PFEs 204, 205 providing an example constant current (e.g., 1.0 A), each of the PFEs 204, 205 may be configured to operate in a different mode.

As further shown, the optical communication system 200 includes a plurality of PFBUs, e.g., PFBUs 218-1 . . . 218-9 disposed along the first and second trunk paths 234, 236. Each of the PFBUs 218-1 . . . 218-9 may be configured to both electrically and optically couple associated branch paths 210-1 . . . 210-7 to their associated trunk path. Components, such as branch terminals 220, 250, 280, 294, 296, optical amplifiers 271, and UDHs 240, 290 may consume power distributed via their associated trunk paths. The specific amount of power consumed by each branch path may vary depending on the components coupled along the branch path, and the length of a given branch path cable segment, e.g., due to resistive losses, for example. The specific power values provided herein are not intended to be limiting and instead are provided merely for clarity and ease of description.

In this example embodiment, each of the PFBUs 218-1 . . . 218-9 may consume up to about 2 kW of power or more, e.g., based in part on their internal loads and the loads coupled to associated branch paths. Thus, the first trunk path 234 may be limited to a particular number of branch paths and an overall distance $D_1$ based on resistive losses and associated loads. In accordance with an embodiment, the PFBU 218-3 may source current via the branch/bridge path 213 to ensure the components disposed along the trunk path region 209 have an adequate amount of available power. Although only a single PFBU 218-4 is shown in trunk path region 209, any number of PFBUs and associated branch configurations may be present depending on a desired configuration.

In the embodiment shown, the PFBU 218-3 may be coupled to a first end of the bridge path 213 and the PFBU 218-7 may be coupled to a second end of the bridge path 213. The PFBU 218-3 and 218-7 may also allow optical signals to be sent between the first and second trunks 234, 236. The PFBUs of FIG. 2 may be implemented in accordance with the PFBU 118-3 discussed above, e.g., with a DDCM arrangement configured in a multi-input, single-output configuration, the description of which will not be repeated for brevity.

Continuing on, if the trunk current ($i_{trunk}$) provided along the first trunk path 234 has about 8 kW of power available (e.g., 8 kV×1 A=8 kW) at the first port of the PFBU 218-3, this alone may not be enough to power the components along the trunk path region 209 that consume a combined 10 kW of power. The PFBU 218-3 may then operate in a multi-source mode, as previously discussed with regard to FIG. 1, to draw an additional power from the trunk/bridge path 213, e.g., ($i_{bridge}$) to provide the additional 2 kW of power needed via a voltage boost. Therefore, the PFBU 218-3 may source power from a branch/bridge current, e.g., $i_{bridge}$, via the PFBU 218-7 to ensure the components of the trunk region 209 have sufficient power and the current remains constant, e.g., assuming the PFBU 218-3 is operating in a constant current mode. As shown, this includes drawing a portion of current from the second trunk path 236, also known as a bridge current ($i_{bridge}$), with the portion of current being sufficient to allow the components of the trunk path region 209 to consume the additional 2 kW of power that is necessary to ensure continued operation. To this end, the PFBU 218-3 is able to maintain a constant current along the trunk region 209 even when the load (e.g., 10 kW) exceeds what the trunk path 234 is capable of supplying via the PFE 204 alone.

Therefore, the PFBU 218-7 may be accurately described as a bridging PFBU 218-7. The bridging PFBU 218-7 may be configured similar to the PFBU 118-3 as discussed above, e.g., include OADM functionality, filters, express channel capability, and so on. The bridging PFBU 218-7 may include an associated DDCM arrangement that includes a single-input, multi-output configuration whereby a first port 226-1 operates as an input to extract current via the cable segment 214-1. The second and third ports 226-2, 226-3 respectively operate as outputs to provide power via the branch/bridge path 213 and cable segments 214-2 . . . 214-N, and more particularly for consumption by components along the cable segments 214-2 . . . 214-N of the second trunk path 236, and by components disposed along the trunk region 209 of the first trunk path 234 by virtue of the PFBU 218-3 operating in the multi-source mode. This DDCM arrangement associated with PFBU 218-7 may be accurately described as a single-input, multi-output converter. Table 2 summarizes the various example DDCM converter modes of the PFBU 218-7 in this embodiment.

TABLE 2

| Mode | Input Port | Output port(s) |
| --- | --- | --- |
| Trunk Output | 1 | 2 |
| Bridge Output | 1 | 3 |
| Multi Output | 1 | 2, 3 |

The PFBU 218-7 may operate in a trunk output mode whereby output current ($I_{out}$) is provided only via the second port 226-2, e.g., to the exclusion of the third port 226-3. Stated differently, the trunk output mode causes the PFBU 218-7 to output current only along the second trunk path 236 to provide power to cable segments 214-2, 214-N, for example. In the branch output mode, the PFBU 218-7 provides a bridge current ($I_{bridge}$) via the third port 226-3 to the exclusion of providing current via the second port 226-2. In the dual-output mode or multi-output mode, the PFBU 218-7 provides a bridge current ($i_{bridge}$) via the third port 226-3, and provides an output current ($i_{out}$) via the second port 226-2. The third port 226-3 may regulate the output bridge current ($i_{bridge}$) based on an associated first set point. The first set point may be one of the operating parameters received by the PFBU 218-7, as discussed above with regard to FIG. 1. The second port 226-2 may be regulated in a similar fashion by the PFBU 218-7 having an associated second set point. The first and second set points may be different or the same depending on a desired output.

In some cases, the PFBU 218-7 may prioritize output via the second port 226-2 to ensure the trunk path 236 is adequately powered. Stated differently, the PFBU 218-7 may reduce or otherwise stop power output via the third port 226-3 in the event demand increases along the trunk path 236 in excess of the power needed to maintain both the first and second set points for the second and third ports 226-2, 226-3, respectively. Alternatively, the PFBU 218-7 may also prioritize power to favor output via the third port 226-3, depending on a desired configuration. In the event the amount of power available from the PFE 205 is less than a threshold value, e.g., <4 kW, then the PFBU 218-7 may switch to the trunk output mode or bridge output mode depending on the implemented priority scheme. The provided power values discussed in the above examples are not intended to be limiting and other power values are also within the scope of this disclosure.

Figure 3:
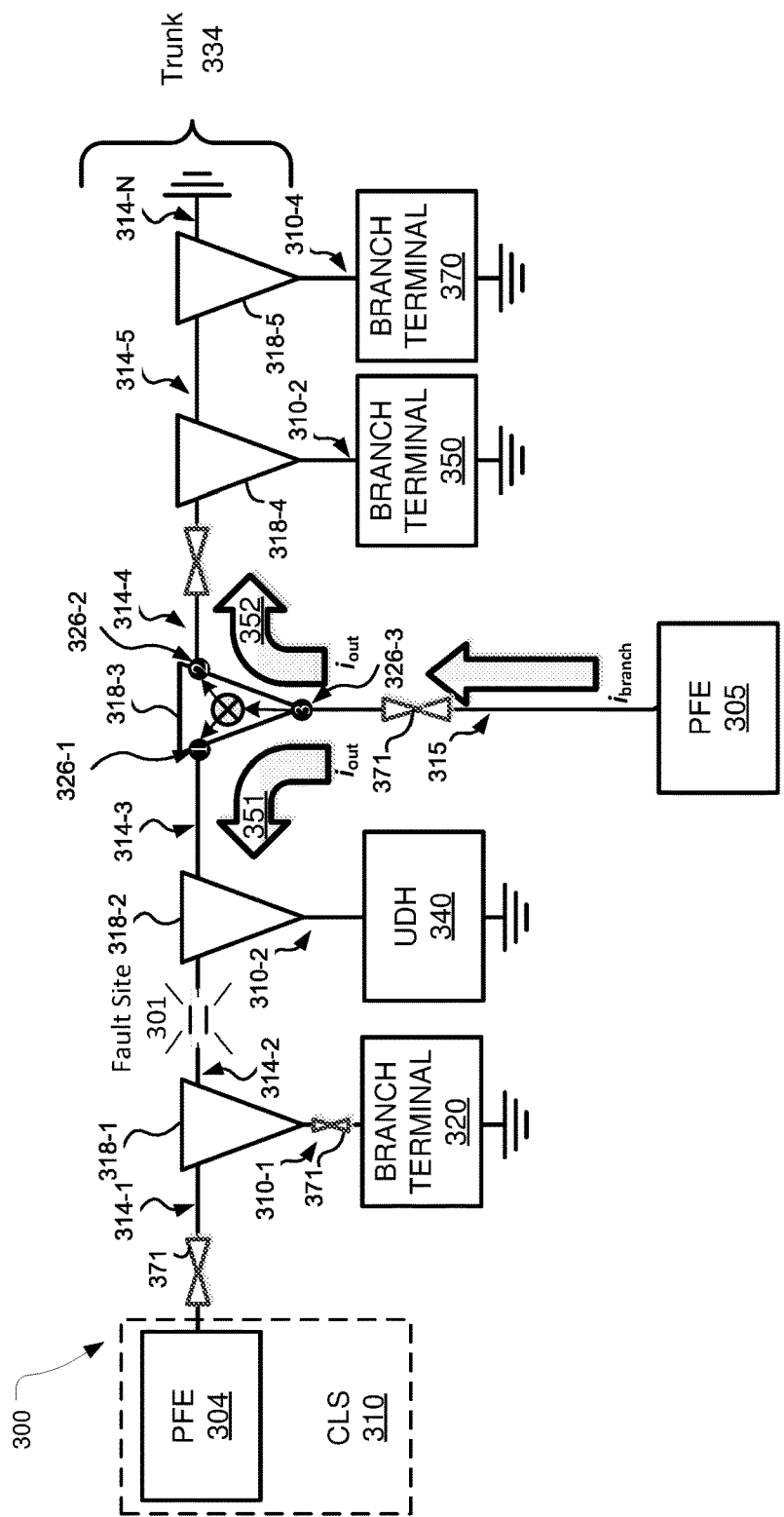
FIG. 3 is another schematic illustration of an optical communication system consistent with an embodiment of the present disclosure.

FIG. 3 shows another example optical communication system 300 in accordance with an embodiment of the present disclosure. As shown, a fault condition 301, e.g., a cable cut or component failure, has electrically decoupled cable segments 314-3 . . . 314-N from the PFE 304. Accordingly, the components disposed along the first cable segment 314-1, e.g., the optical amplifier 371, BU 318-1 and branch terminal 320, remain powered. However, the components along the cable segments 314-2 . . . 314-N, e.g., the BUs 318-2 . . . 318-5, UDH 340, branch terminals 350, 370, may become unpowered as a result of the fault 301 and may cause a loss of communication along the affected/faulted portion of the trunk path 334.

The BU 318-3 may be implemented as a PFBU in accordance with the present disclosure. Accordingly, the PFBU 318-3 may transition from a present mode, e.g., a trunk source mode as discussed above with regard to FIG. 1, to a fault recovery mode. For instance, the PFBU 318-3 may include an associated DDCM arrangement that includes a single-input, multi-output configuration, as discussed above, whereby power may be sourced via the branch path 315. In particular, the third port 326-3 may be coupled to the PFE 305 through the branch path 315. In some cases, the PFE 305 may be disposed on a platform or may be disposed in-land as a terrestrial PFE, for example. The PFBU 318-3 may extract current via the third port 326-3 and may output the same via the first and second ports 326-1, 326-2 as a first output current 351 and second output current 352, respectively.

FIG. 4 shows another example of an optical communication system 400 in accordance with an embodiment of the present disclosure. The optical communication system 400 is shown in a highly simplified form for simplicity and ease of description. As shown, the optical communication system 400 includes a dual-end feed trunk cable powered by PFEs 404, 406. The PFEs 404 and 406 may be located at opposite cable landing stations, for instance. Each of the PFEs 404, 406 may be configured to supply, for example, up to 10 kW of power for loads along the trunk path 412, and the PFE 408 may be configured to supply, for example, up to 2 kW of power for loads along the branch path 410, e.g., the optical amplifiers 471, branch terminal equipment and so on. The PFE 408 may be configured to provide single-end power for the entire branch path 410 under normal operation, and the PFBU 418 may remain "live" at the trunk-end of the branch path 410 by maintaining a low power/voltage to a virtual ground (not shown) located, for example, a few hundred meters down the branch path 410.

When a fault site 401 occurs, e.g., a shunt fault due to a cable cut, the PFBU 418 may detect the fault condition by comparing voltages and/or currents to an associated threshold value. In response, the PFBU 418 may then automatically reconfigure output to compensate accordingly. Alternatively, or in addition to automatic reconfiguration, the PFBU 418 may send a signal to raise an alarm to notify a cable station that a fault condition has occurred. In any event, when the PFBU 418 detects a voltage/power change that exceeds a threshold, the PFBU 418 may respond to the detected fault site 401 by drawing power from the trunk path 412 to keep the branch path 410 powered to the shunt fault. The PFE 408 may continue to power the unaffected portion of the branch path 410. In the event such a fault occurs and power is compromised, but not the data-carrying fiber(s), the optical amplifiers 471 remain powered/live and the branch path 410 therefore remains operational to allow for communication to/from the branch path 410. This advantageously allows the trunk to remain operational while a branch is repowered.

FIG. 5 shows a diagram of an example branching configuration 500 consistent with an embodiment of the present disclosure. As shown, the branching configuration 500 includes a PFBU 518 coupled to a trunk path, e.g., trunk path 112 of FIG. 1, via optical fibers. The PFBU 518 is shown in a highly simplified form for clarity and practicality. As further shown, the PFBU 518 couples to trunk cable segments 514-1, 514-2 of the trunk path 112, which include trunk optical fibers 550 . . . 556 and electrical conductors 558, 560. The trunk cable segment 514-1 may be referred to as a first trunk cable segment 514-1 and the second trunk cable segment 514-2 maybe referred to as a second trunk cable segment 514-2. The PFBU 518 may support a redundant east-west configuration whereby optical signals may be redundantly transmitted and received via signals traveling opposite directions. The PFBU 518 also couples to branch cable segment 517, with the branch cable segment 517 providing branch fibers 564, 566 and electrical conductor 562.

The trunk path 112 may carry express channels and local channels, which are managed by the branching configuration 500. For example, a signal that originates at CLS 110 (FIG. 1) may include one or more information signals occupying one or more channels (e.g., express channels and local channels). Likewise, a signal that originates at branch terminal 120 may also include one or more information signals occupying one or more channels (e.g., local channels). Channels carrying information signals may also be referred to as utilized channels. The trunk and branch signals may also include loading signals on channels without information signals, referred to as unutilized channels, to maintain uniform channel loading. A loading signal may include a non-information carrying signal such as broadband noise, e.g. ASE noise, ASE noise band or a dummy tone. Dummy tones generally refer to optical energy that is centered on a specific wavelength and that does not carry information or traffic.

Any express channels may be passed from the originating trunk terminal to the trunk path directly through the PFBU/BU unit without interruption. One or more local channels may be dropped from the trunk path 112 or added to the trunk path 112 at the PFBU units. PFBU unit 518 may be configured to drop, i.e. extract, one or more local channel wavelengths carrying information signals originating from the CLS 110. The information signals on the dropped local channels may then be passed to a branch terminal equipment. PFBU 518 may also be configured to add, i.e. insert, one or more local channel wavelengths carrying information signals originating from associated branch/bridge equipment to the trunk path 112. The resulting WDM optical signal, i.e. including the added information signals, may then be passed onto the trunk path 112 (e.g., onto segment 514-2 following the PFBU 518). The local channels carrying information signals that originate at other terminals may be similarly added and/or dropped by the PFBU 518. Recall that two trunks may be connected via a bridge path, such as the bridge path 213 discussed above with regard to FIG. 2, with the bridge path optically and electrically coupling a first and second trunk. Thus, nodes of a first trunk path may communicate in a bidirectional or unidirectional manner with nodes of a second trunk path via PFBUs using a bridge path as variously disclosed herein.

As shown, express channels pass through the branching configuration 500 from the first trunk cable segment 514-1 to the second trunk cable segment 514-2, and vice-versa. One or more local channels (also referred to as drop channels) may pass through the branching configuration 500 from trunk path 112 to the branch/bridge via a drop branch path provided by branch optical fiber 566. One or more local channels (also referred to as add channels) may pass through the branching configuration 500 from an add branch path provided by the add branch fiber 564 to the trunk path 112.

The adding and dropping of the local channel wavelengths is generally referred to as optical add drop multiplexing (OADM). To implement OADM in the branching configuration 500, for example, the branching configuration 500 may implement the following functions: splitting, filtering and combining. The splitting function involves splitting optical power on one input fiber into two or more outgoing fibers. An optical coupler is one example of a device that can implement the splitting function. The filtering function involves blocking at least a portion of an input optical spectrum (i.e., one or more wavelengths) from one or more outgoing fibers while allowing other wavelengths to pass. Optical filters that transmit some wavelengths and block one or more specific wavelengths can be implemented using technologies such as thin film optical filters and fiber Bragg gratings, for example. The filtering function may also involve filtering using filter configurations that do not discriminate by optical wavelength such as, for example, an attenuator and an all-pass filter. The combining function involves merging optical signals from two or more sources onto a single output fiber. An optical coupler is one example of a device that can implement the combining function.

The OADM functionality in the undersea branching configurations referenced in this disclosure may be implemented using optical devices of fixed optical characteristics. The OADM functionality may also be implemented using optical devices for which the optical coupling and/or optical filtering characteristics may be changed or controlled in an installed branching configuration using local or remote control signals to the devices. In one example, an undersea system operator may transmit a control command to the PFBU 518 unit as an optical signal transmitted through the optical fibers in the undersea system cables. Examples of controllable optical devices that may be used to provide OADM functionality include, without limitation, optical switches, tunable optical filters, variable optical attenuators, wavelength selective switches/filters, optical splitters, and reconfigurable optical add drop multiplexers (ROADMs).

The PFBU 518 may be implemented with the splitting and combining functions via OADM components 534. For example, the OADM components 534 may include a drop band pass filter (BPF-D) for passing that portion of the total optical spectrum of the trunk path required by the branch path, an add band pass filter (BPF-A) for passing that portion of the branch path optical spectrum to be added to the trunk path, and a band reject filter (BRF) for rejecting or blocking trunk path channel wavelengths to be reused when channel wavelengths are added.

The PFBU 518 may also be implemented with a DDCM arrangement 501. The DDCM arrangement 501 may electrically isolate the trunk path 112 from an associated branch path and may extract power therefrom, e.g., via cable segments 514-1, 514-2. The PFBU 518 may condition the extracted power, e.g., down-convert from a high voltage HV to a medium voltage MV, and supply a branch/bridge with the extracted and conditioned power. Note that current within the DDCM arrangement 501 may flow in a plurality of directions depending on the particular mode of operation chosen for the PFBU, as previously discussed above with regard to FIGS. 1-4, which will not be repeated for brevity.

The DDCM arrangement 501 includes a power and telemetry 510 arrangement, HV switches 512, 516, 519 and DDCM 515. The power and telemetry arrangement 510 may include circuitry and components suitable for sending and receiving, for example, channel wavelengths via the trunk 112. The power and telemetry 510 arrangement may use received channel wavelengths to adjust operation of the DDCM arrangement 501, e.g. to apply new operating parameters such as set points, source mode (constant current, constant voltage), close/open one or more of HV switches 512, 516, 519 and to send alarms to cable stations, depending on a desired configuration. The power and telemetry arrangement 510 may further include a power supply to source power via the trunk 112, for example, to supply power to internal loads of the PFBU 518, such as the DDCM 515.

The HV switches 512, 516, 519 may be configured to switchably couple input ports, e.g., ports 626-1, 626-2, 626-3 (FIG. 6) of the DDCM 515 to sea ground 524 in the event of a fault condition or to ensure safety as repair is performed on the PFBU 518, for example. The sea ground 524 may be cathodic and/or anodic, for example.

The DDCM 515 may be configured to operate in a multi-input, single-output converter mode, as discussed above with regard to FIG. 1, and/or a single-input, multi-output converter mode, as discussed above with regard to FIG. 2, depending on a desired mode. In some cases, the PFBU 518 may switch between modes depending on the power distribution needs of a given optical communication system. For example, the PFBU 518 may operate in a mode that sources power from both a branch path and the trunk path (e.g., a dual-input mode) to supply power to a downstream portion of the trunk path 112, e.g., trunk region 109 of FIG. 1. In response to the PFBU 518 determining a fault associated with the trunk cable segment 514-1, the PFBU 518 may switch to a dual-output power mode, whereby power is drawn from the branch/bridge to continue to power the east portion of the trunk path 112 and the unaffected west portion of the trunk path 112.

Turning to FIG. 6, one example DDCM 515A suitable for use in the PFBU 518 is shown in accordance with an embodiment of the present disclosure. As shown, the DDCM 515A includes a first, second and third port 626-1, 626-2, 626-3, with each of the ports being configured to couple to an electrical conductor of a cable segment. For example, the first port 626-1 may be configured to couple to the electrical conductor 558 of the first trunk cable segment 514-1, the third port 626-3 may be configured to couple to the electrical conductor 562 of the branch cable segment 517, and the second port 626-2 may be configured to couple to the electrical conductor 560 of the second trunk cable segment 514-2. The DDCM 515A may be configured to extract current from one or both of the first and second ports 626-1, 626-2 to provide power to the branch via the third port 626-3.

In other cases, the first and second ports 626-1 and 626-2 may be coupled to a first trunk path cable segment, e.g., trunk path cable segment 114-3, and a branch/bridge cable segment, e.g., branch path cable segment 113, respectively, to provide power to a second trunk path cable segment, e.g., trunk path cable segment 114-4, as discussed above with reference to FIG. 1. This embodiment of the DDCM 515A may thus provide a multi-input, single-output configuration, although other configurations also within the scope of this disclosure.

As further shown, the DDCM 515A includes a clamp 602, first and second converters 604-1, 604-2, controller 606, rectifier 614, filter 616, and clamp 608. The controller 606 may be powered via a power supply in the power and telemetry arrangement 510, for example, which may provide a usable voltage, e.g., a medium or low voltage, from a high voltage provided along a trunk path. Note that in some cases the controller 606 is implemented within the power and telemetry arrangement 510 and may not necessarily be a separate component as shown.

The controller 606 may be implemented as a microprocessor, processor, circuitry, a field programmable gate array (FPGA), or any other suitable controller device. The first and second converters 604-1, 604-2 may be configured to produce a regulated DC voltage, and then may chop the regulated DC voltage to produce an AC signal. The AC may then go through the transformer for isolation and then may be rectified and filtered via the rectifier 614 and filter 616, respectively, to produce a DC output. The clamp 608 on the output may ensure that the cable is discharged for worker safety, for example. The clamp 602 on the input diverts surge current around the converter (e.g., to provide a pass-through) during a cable fault. The clamp 602 may also clamp to ground on each trunk cable to protect works when making repairs to respective trunk cables.

The first and second converters 604-1, 604-2 may thus provide two power stages. Each of the first and second converters 604-1, 604-2 may include a boost converter (not shown) and a chopper (not shown). The first and second converters 604-1, 604-2 may be configured with a half-bridge (e.g., two transistor configuration) or full-bridge (e.g., four transistor configuration) switching arrangement, for example. Each of the first and second converters 604-1, 604-2 may be operated by, for example, soft switching via the controller 606, e.g., PWM signals, to steer some portion of the line current from one or both of the first and second ports 626-1, 626-2, depending on the current operating mode. Other power regulation schemes are within the scope of this disclosure and this disclosure is not necessarily limited to PWM implementations. In addition, a common transformer may be utilized with magnetic flux adding power at the output stage. In any event, the first and second converters 604-1, 604-2 may feed the boosted current to a chopper, with each respective chopper driving the primary windings of the isolation transformer 630. Isolation transformer 630 may provide galvanic isolation between the first and second ports 626-1, 626-2 and the third port 626-3.

Each of the boost converters of the first and second converters 604-1, 604-2 may be driven by the controller 606 via a first and second pulse width modulation (PWM) signal, respectively, with the first PWM signal being different than the second PWM signal. The controller 606 may draw an asymmetrical load from each of the first and second ports 626-1, 626-2 based on the first and second PWM signals. The controller 606 may therefore draw a different amount of power from the first and second ports 626-1, 626-2, to achieve a desired output current/voltage.

Each of the first and second converters 604-1, 604-2 may be configured the same, or different, depending on a desired configuration. Regulation of the output, e.g., port 626-3, is relatively similar to that of a single-input converter with the addition of a control scheme that ensures switching of the first and second converters 604-1, 604-2 to selectively extract current from each of the first and second ports 626-1, 626-2. Switching in this fashion may ensure that the first converter 604-1 is switched "on" while the second converters 604-2 is switched "off" and vice-versa to prevent input through both ports simultaneously. During the time when each of the converters 604-1, 604-2 is switched "on" current flows through the ports 626-1, 626-2. By controlling the proportion of time during which the first converter 604-1 is switched on versus the second convert 604-2, the ratio of input currents may be controlled. In an embodiment, the ratio of input currents between the first and second ports 626-1, 626-2, is not necessarily dependent on the total output load current so long as the duty cycle control, e.g., the first and second PWM signal, for each of the first and second converters 604-1, 604-2, scales the two input current times in such a way that the ratio of input via the first port 626-1 and the second port 626-2 is maintained substantially constant.

In some cases, the DDCM 515A may output a constant current or constant voltage with an in-cycle switching scheme or other schemes such as a cycle-by-cycle operation. The output voltage may be controlled by the ratio of Equation (1):

$$D = \frac{PW}{T} \times 100 \qquad \text{Equation (1)}$$

Where (D) is the duty cycle, (PW) is the combined switched "on" time for the first and second converters 604-1, 604-2, and (T) is the total period for the signal. To keep the ratio of average input currents approximately constant, the following ratio of input current from the first converter 604-1 versus the second converter 604-2 may be kept substantially constant:

$$\text{Input Ratio} = \frac{T_{in\_1}}{T_{in\_2}} \qquad \text{Equation (2)}$$

where ($T_{in\_1}$) represents the on time for the first converter 604-1 and ($T_{in\_2}$) represents the on time for the second converter 604-2. Thus output voltage may be regulated by varying the duty ratio, which may be performed without necessarily altering the input current ratio between the first and second port 626-1, 626-2. Controlling the output voltage in this fashion allows a PFBU to maintain a constant current or constant voltage output at the third port 626-3.

In accordance with an aspect of the present disclosure an optical system is disclosed. The optical system including at least one cable landing stations (CLS) coupled to a first trunk path, the first trunk path including at least a first trunk path cable segment and a second trunk path cable segment, each of the first and second trunk path cable segments comprising an undersea cable having at least one electrical conductor, respectively, and at least one power feed branching unit (PFBU) located in an undersea environment coupled between the first and second trunk path cable segments, the PFBU having a DC/DC converter (DDCM) arrangement with a first port to electrically couple to the at least one electrical conductor of the first trunk path segment, a second port to electrically couple to the at least one electrical conductor of the second trunk path segment, and a third port to electrically couple to an electrical conductor of a branch path cable segment, wherein the DDCM arrangement maintains a constant output current level via the second port based at least in part on a first input current received via the first port coupled to the at least one electrical conductor of the first trunk path segment and a second input current received via the third port coupled to the electrical conductor of the branch path cable segment.

In accordance with another aspect of the present disclosure an optical communication system is disclosed. The optical communication system including a first cable landing stations (CLS) coupled to a first trunk path, the first trunk path including at least a first trunk path cable segment and a second trunk path cable segment, each of the first and second trunk path cable segments of the first trunk path comprising an undersea cable having at least one electrical conductor, respectively, and a second CLS coupled to a second trunk path, the second trunk path including at least a first trunk path cable segment and a second trunk path cable segment, each of the first and second trunk path cable segments of the second trunk path comprising an undersea cable having at least one electrical conductor, respectively, and a first power feed branching unit (PFBU) electrically coupled between the first and second trunk path cable segments of the first trunk path, a second PFBU electrically coupled between the first and second trunk path cable segments of the second trunk path, the second PFBU being electrically coupled to the first PFBU via a bridge path cable segment, and wherein the first PFBU is configured to receive a bridge current from the second PFBU and provide an output current to at least one of the first and second trunk path cable segments of the first trunk path based at least in part on the received bridge current.

In accordance with another aspect of the present disclosure a method for crowd sourcing power within a an optical communication system is disclosed. The method comprising coupling power feed equipment to a trunk path, coupling a plurality of power feed branching units (PFBUs) to the trunk path in series, each of the PFBUs being configured to receive a first constant current via a first port and output a second constant current via a second port, coupling a branch path to a third port of each of the PFBUs, and selectively extracting a third current from at least one of the branch paths by one or more of the PFBUs and providing the second constant current via the second port based at least in part on the extracted third current.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Also features of any embodiment described herein may be combined or substituted for features of any other embodiment described herein.

What is claimed is:

1. An optical system comprising:
at least one cable landing stations (CLS) coupled to a first trunk path, the first trunk path including at least a first trunk path cable segment and a second trunk path cable segment, each of the first and second trunk path cable segments comprising an undersea cable having at least one electrical conductor, respectively; and
at least one power feed branching unit (PFBU) located in an undersea environment coupled between the first and second trunk path cable segments, the PFBU having a DC/DC converter (DDCM) arrangement with a first port to electrically couple to the at least one electrical conductor of the first trunk path segment, a second port to electrically couple to the at least one electrical conductor of the second trunk path segment, and a third port to electrically couple to an electrical conductor of a branch path cable segment,
wherein the DDCM arrangement maintains a constant output current level via the second port based at least in part on a first input current received via the first port coupled to the at least one electrical conductor of the first trunk path segment and a second input current received via the third port coupled to the electrical conductor of the branch path cable segment.

2. The optical system of claim 1, wherein the DDCM arrangement further comprises a first converter stage coupled to the first port and a second converter stage coupled to the third port.

3. The optical system of claim 2, wherein the first and second converter stages comprise a full-bridge switching arrangement.

4. The optical system of claim 2, wherein the DDCM arrangement further comprises a controller coupled to the first and second converter stage.

5. The optical system of claim 4, wherein the controller is configured to provide a first pulse width modulation (PWM) signal to the first converter stage and a second PWM signal to the second converter stage to cause the first and second converter stages to extract a first and second current level, respectively.

6. The optical system of claim 5, wherein the controller varies an amount of current received via the first port relative to the third port by varying a duty cycle of the first PWM signal relative to a duty cycle of the second PWM signal.

7. The optical system of claim 6, wherein a difference between the duty cycle of the first PWM signal and the duty cycle of the second PWM signal is kept constant.

8. The optical system of claim 6, wherein an associated duty cycle of the first and second PWM signal is based at least in part on a prioritization scheme to asymmetrically draw power from the first port relative to the third port.

9. The optical system of claim 1, wherein the at least one PFBU includes a plurality of high voltage switches, each of the high voltage switches being coupled to a respective one of the first, second and third port of the DDCM arrangement and being switchably coupled to a sea ground for isolation purposes.

10. The optical system of claim 1, wherein the first and second ports of the DDCM arrangement are electrically isolated from the third port of the DDCM arrangement.

11. The optical system of claim 9, wherein electrical isolation between ports of the DDCM arrangement comprises galvanic isolation provided by at least one isolation transformer.

12. The optical system of claim 1, wherein the PFBU comprises at least one splitter or a wavelength selective filter configured to provide optical add drop multiplexing (OADM) functionality.

13. An optical communication system comprising:
a first cable landing stations (CLS) coupled to a first trunk path, the first trunk path including at least a first trunk path cable segment and a second trunk path cable segment, each of the first and second trunk path cable segments of the first trunk path comprising an undersea cable having at least one electrical conductor, respectively; and
a second CLS coupled to a second trunk path, the second trunk path including at least a first trunk path cable segment and a second trunk path cable segment, each of the first and second trunk path cable segments of the second trunk path comprising an undersea cable having at least one electrical conductor, respectively; and
a first power feed branching unit (PFBU) electrically coupled between the first and second trunk path cable segments of the first trunk path;
a second PFBU electrically coupled between the first and second trunk path cable segments of the second trunk path, the second PFBU being electrically coupled to the first PFBU via a bridge path cable segment; and
wherein the first PFBU is configured to receive a bridge current from the second PFBU and provide an output current to at least one of the first and second trunk path cable segments of the first trunk path based at least in part on the received bridge current.

14. The optical communication system of claim 13, wherein the bridge current provided by the second PFBU is a constant current, and wherein the output current provided by the first PFBU is a constant current.

15. The optical communication system of claim 13, wherein the first and second PFBU include a DC/DC converter (DDCM) arrangement.

16. The optical communication system of claim 15, wherein the first PFBU outputs a constant current to the second trunk path cable segment of the first trunk based on at least one of a constant current received via the second PFBU and/or a constant current received via the first trunk cable segment of the first trunk path.

17. A method for crowd sourcing power within an optical communication system, the method comprising:
coupling power feed equipment to a trunk path;
coupling a plurality of power feed branching units (PFBUs) to the trunk path in series, each of the PFBUs being configured to receive a first constant current via a first port electrically coupled to the trunk path and output a second constant current via a second port electrically coupled to the trunk path;
coupling a branch path to a third port of each of the PFBUs; and
selectively extracting a third current from at least one of the branch paths by one or more of the PFBUs and providing the second constant current to the trunk path via the second port based at least in part on the extracted third current.

18. The method of claim 17, wherein the third current is provided by power feed equipment associated with each of the at least one branch path.

19. The method of claim 18, wherein the one or more of the PFBUs extract the third current from associated branch paths in response to a fault condition along the trunk path that disrupts power provided by the power feed equipment of the trunk path.

20. The method of claim 17, wherein each of the PFBUs is configured to maintain a substantially similar constant current output level relative to each other via the second port.

* * * * *